B. F. Bee,
Screw-Threading Machine,
Nº 54,096. Patented Apr. 24, 1866.
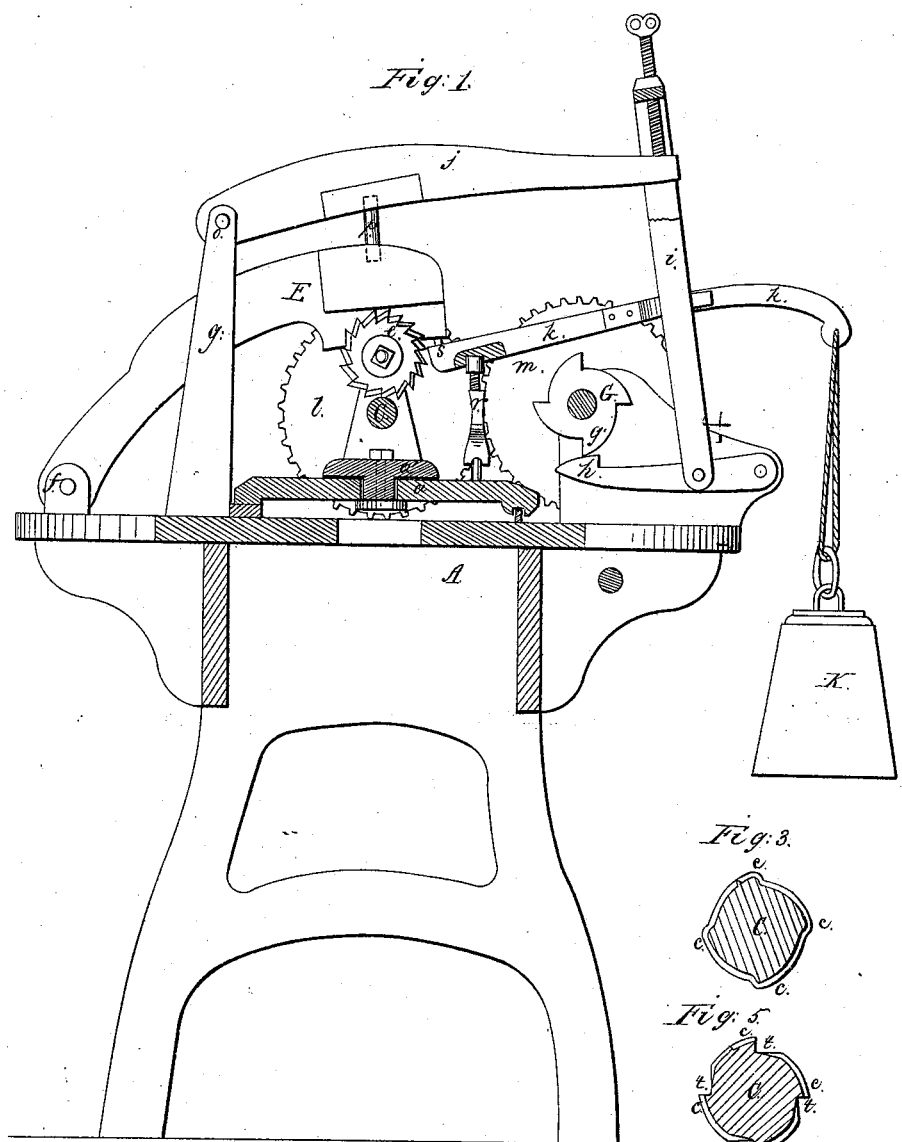
Fig. 1.
Fig. 3.
Fig. 5.
Fig. 2.
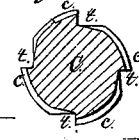
Fig. 4.
Witnesses;
Inventor;
B. F. Bee,
Per Munn & Co.
Attorneys.

UNITED STATES PATENT OFFICE.

BENJAMIN F. BEE, OF HARWICH, MASSACHUSETTS.

IMPROVED SCREW-TAP.

Specification forming part of Letters Patent No. 54,096, dated April 24, 1866.

*To all whom it may concern:*

Be it known that I, BENJAMIN F. BEE, of Harwich, Barnstable county, Massachusetts, have invented a new and Improved Screw-Tap; and I do hereby declare that the following is a full, clear, and exact description thereof, which will enable others skilled in the art to make and use the same, reference being had to the accompanying drawings, forming part of this specification.

This invention relates to a new and improved mode of making screw-taps, whereby taps of very superior cutting qualities are produced, and at a less cost than heretofore.

In making screw-taps as ordinarily the tapering blank has a common screw-thread cut upon it, and in this shape it is submitted to the planer or file, and the thread is cut up into sections by running longitudinal grooves in the sides of the tap, one side of all the grooves having a perpendicular face, which forms the cutting face or edges, and the other side of the grooves sloping away gradually. Then the sections of the screw-thread are filed away more or less in the rear of their perpendicular cutting-faces; but this is not only a very laborious operation, but it is always more or less imperfectly done, and never with that thoroughness and nicety which is necessary for a perfect tool, and consequently the tool is made to bite only by the application of much force, so that to a certain extent the cutting parts are jammed into their work instead of making their way through with a clean and free cut.

My invention consists in so forming the screw-thread that the tap is finished when the grooves have been planed in its sides, and this I accomplish by combining with the ordinary screw-cutting appliances suitable mechanism for throwing the thread of the screw into volutes, there being in a cross-section of the tap as many volutes as there are to be cutting-sections of screw-thread when the grooves have been run. And in grooving the tap the perpendicular cutting-faces are formed on the outer ends of the volutes, so that in this tool the screw-thread sections in the rear of their cutting-edges recede toward the center of the tool with mechanical precision and uniformity.

Having described the nature of my invention, I will proceed to describe its construction and operation.

Figure 1 in the accompanying plate of drawings shows the manner of cutting the irregular screw-thread upon the tap-blank. Fig. 2 is a side view of the tap after the irregular screw-thread has been cut thereon, and Fig. 3 is a cross-section of the same. Fig. 4 is a side view of the tap when finished by running the grooves, and Fig. 5 is a cross-section of the same.

Similar letters of reference in the different figures indicate corresponding parts.

A, Fig. 1, is a screw-cutting lathe, designed especially for cutting the screw-thread in an irregular form, as shown by cross-section, Fig. 3, and consists in a sliding carriage, $a\ a'$, which carries the blank $c$ in the ordinary manner by means of the feeding-screw $d$, in connection with the ordinary gearing, &c., and in a circular cutting-tool, $e$, which has a serrated edge for cutting the thread, and acts upon the blank C by being rotated, this thread-cutter $e$ being suspended on a lever, E, which is pivoted or hinged to the lathe at $f$, so that lever E may vibrate vertically and give the cutter $e$ the variable feed necessary for making the irregular cut, the vertical movement of the lever E and cutter $e$ being dictated by a form or cam-wheel, G, and lever $h$, in connection with the connecting-rod $i$ and lever $j$, and also weighted lever $k$.

The shaft of the chuck by which the screw-blank C is rotated has a gear-wheel, $l$, fixed thereon, and this wheel gears into a second wheel, $m$, of the same diameter, which is fitted on the shaft of the cam-wheel G, so that the rotations of the blank C and dictating or cam wheel G are in union always, and so that the irregularities or volutes of the thread are ranged in regular series down the sides of the tap.

$n$ is a set-screw by which the cutter is adjusted to different sizes of work.

The lever $j$ is pivoted to a vertical standard, $q$, by the pivot $o$, and it bears upon the lever E by means of the pin $p$, which is kept in place by its ends occupying a cavity in either lever.

The lever $k$, with its weight K, gives the upward motion of the cutter, and causes the lever $h$ to hug the slack places in the cam-wheel G.

This lever $k$ has its fulcrum on a hinged standard, $r$, and engages with the lever E by means of a pin, S. For giving the tapering cut on the screw-blank one of the centers is elevated, as usual.

The operation of the machine is as follows: The machine being set in motion, the carriage $a'$ $a$ slowly advances, as ordinarily, and the blank C receives a rotating motion, with the cam-wheel rotating in concert therewith. The cutter $e$ is also in motion, and, owing to its numerous cutters, which relieve each other in regular succession, it may be driven over more ground in a given time than a single cutting-edge. Less care and accuracy in the formation of the blanks are also admissible with this cutting-tool, and it finishes the thread as it goes and passes over the blank but once. As one of the cams $g$ passes the lever $h$ the lever is gradually depressed, and the cutter $e$ is meanwhile gradually fed deeper into the blank; but when the cam $g'$ has cleared the head of lever $h$, then the weighted lever $k$ throws the cutter $e$ suddenly up until stopped by $h$ coming in contact with the next cam on the wheel G, when the movement is repeated as before, and by this means the volutes in the screw-thread are formed at regular intervals.

C in Figs. 2 and 3 shows the tap as it comes from the screw-cutting machine, and $c\ c\ c\ c$, Fig. 3, show the volutes of the screw-thread. Figs. 4 and 5 show the tap when the grooves $t\ t$ have been run and the tool finished by the said grooving, or giving the outer ends of the volutes a perpendicular cutting-face.

Screw-taps of this construction do not require backing up when at work to keep them clear from choking, but advance with a free and steady cut to the completion of the tap. By these means the sections of the screw-thread are formed into cutters of correct and faultless shape, and a uniformity of clearance is given them that is not attainable by the ordinary method; and by this method an important saving of labor is also made in their manufacture.

The machine herein shown and described, and by which this improvement in screw-taps is made, will form the subject of a separate patent, and the parts thereof will not be claimed herein.

Having thus described my invention, I claim as an improved article of manufacture—

The screw-tap made as herein shown and described, substantially in the manner and for the purpose set forth.

BENJAMIN F. BEE.

Witnesses:
M. M. LIVINGSTON,
ALEX. F. ROBERTS.